UNITED STATES PATENT OFFICE 2,425,542

PROCESS FOR DEHYDRATING CARBOXYLIC ACIDS

Vernon K. Krieble, Hartford, Conn., and Robert H. Smellie, Oak Ridge, Tenn.

No Drawing. Application July 13, 1944, Serial No. 544,828

16 Claims. (Cl. 260—541)

1

This invention relates to a process for dehydrating carboxylic acids containing water.

It is known that liquid carboxylic acids containing water can be dehydrated by introducing an entraining agent into the aqueous acid and removing the water as an azeotrope by distillation. These methods, especially in the case of formic acid, are time consuming and expensive. Aqueous formic acid has been dehydrated by introducing formamide and a strong mineral acid such as sulfuric acid, into the aqueous formic acid and heating the mixture. Ammonium sulfate is formed and a great part of the water in the formic acid dissipated.

We have now found that aqueous liquid carboxylic acids can be dehydrated by treating them with a mixture of an organic nitrile or hydrogen cyanide and hydrogen chloride. The carboxylic acids are dehydrated rapidly without heating and to a high degree.

It is accordingly an object of our invention to provide a method for dehydrating carboxylic acids. Other objects will become apparent hereinafter.

In accordance with our invention we dehydrate carboxylic acids containing water and which are liquid at 25° C. by reacting the aqueous acid with an organic nitrile or hydrogen cyanide and hydrogen chloride. The reaction that takes place can be represented by the following chemical equations:

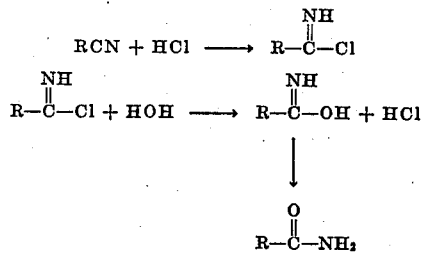

wherein R represents hydrogen or an organic radical, e. g. alkyl, aralkyl, aryl, etc. It will be observed from these equations, that the material acting as the dehydrating agent is an imino acyl chloride. This material apparently reacts very rapidly with the water present to give an amide and regenerate hydrogen chloride. Accordingly, the hydrogen chloride need not be employed in an amount molecularly equivalent to the nitrile. To remove all the water an amount of nitrile or hydrogen cyanide at least molecularly equivalent to the water present must be used. However, with hydrogen cyanide a part of the form-

2 amide generated during the dehydration is hydrolyzed to formic acid with the simultaneous formation of ammonia which immediately reacts with hydrogen chloride to form ammonium chloride, thereby reducing the effective concentration of hydrogen chloride.

Our new process is especially useful in dehydrating aqueous acids of the homologous series of which formic acid is the first member, particularly acids containing from one to four carbon atoms, i. e., formic acid, acetic acid, propionic acid and the butyric acids. In the case of acids other than formic acid, a mixture of the anhydrous acid with some formic acid may be obtained. However, such mixtures can be separated by simple distillation using an efficient column.

The following examples will serve to illustrate the manner of practicing our invention.

*Example 1.—Dehydration of formic acid with hydrogen cyanide*

28 g. of hydrogen cyanide were added to 228 g. of 90% aqueous formic acid which had been previously saturated with hydrogen chloride at 0° C. The resulting mixture was allowed to stand for 10 to 12 hours. It was then distilled through an efficient fractionating column. 122 g. of anhydrous formic acid distilled at from 99.5 to 100° C. This fraction melted at 8° C. A second fraction of 39 g. distilled at from 100 to 102° C. and melted at 6° C. From the residue 28 g. of chemically pure ammonium chloride separated out, leaving a filtrate of 68 g. which was a solution of ammonium chloride and formamide in formic acid.

*Example 2.—Dehydration of acetic acid with hydrogen cyanide*

A solution consisting of 0.48 gram-mole of hydrogen cyanide, 0.47 gram-mole of hydrogen chloride, 0.44 gram-mole of water and 2.33 gram-mole of acetic acid was prepared by mixing in the following way: 130 cc. of acetic acid containing 17 g. of hydrogen chloride were diluted with 8 g. of water at a temperature of 26° C. To this solution, 40 cc. of acetic acid containing 13 g. of hydrogen cyanide were added. The temperature began to rise immediately and after 12 minutes reached 71° C. It remained at 71° C. for about 4 minutes and then receded. At the end of 12 minutes, 92% of the hydrogen cyanide had disappeared. After a short interval, the reaction mixture was transferred to a flask connected to a 40-inch Snyder floating ball distilling column. Upon heating the flask some hydrogen chloride was evolved from the reaction mixture. The first liquid to condense was acetic acid. It boiled at 116° C. and had a freezing point of 15.1° C. This corresponds to a purity of better than 99% while the acid which was used as starting material contained more than 5% of water. 121 g. of acetic acid were obtained. The liquid remaining in the still was cooled and diluted with diethyl ether which caused the separation of 0.2 g. of ammonium chloride. The ether was evaporated on the steam bath and the syrupy residue was distilled under vacuum, yielding 8 g. of acetic acid and 18 g. of colorless formamide which distilled at 94 to 110° C. at a pressure of 17 mm. of Hg pressure.

*Example 3.—Dehydration of acetic acid with acetonitrile*

To 147 cc. of an acetic acid solution saturated with hydrogen chloride at 0° C., 7 cc. of water and 22 cc. of acetonitrile were added. The temperature jumped to 15° C. immediately and reached 30° C. in fifteen minutes and 39° C. within thirty minutes. Within an hour it dropped to 35° C. and at the end of four hours it was still 32° C. In the meanwhile a heavy precipitate of acetamide hydrochloride separated. About 12 hours later the solution was quickly filtered by gravity through glass wool and the filtrate distilled through a Snyder floating ball distilling column. Upon heating some hydrogen chloride was given off. Before 3 cc. had collected in the receiver the temperature had reached 115° C. 77 cc. of acetic acid distilled between 115.5 and 116° C. The freezing point of this distillate was 16.5° C. This represents a purity of better than 99.8%.

*Example 4.—Dehydration of acetic acid with hydrogen cyanide*

A solution of hydrogen chloride in 100% acetic acid containing 23 g. (0.64 mole) of hydrogen chloride and 145 g. of acetic acid was placed in a balloon flask equipped with a thermometer and a dropping funnel, the flask being connected to a manometer and a hydrogen chloride recovery system by means of a three-way stopcock. A mixture of 13 g. of hydrogen cyanide and 8 g. of water was added at once and the flask was connected to the manometer. The temperature rose steadily (thermometer bulb immersed in the liquid) and the pressure (due to hydrogen chloride) increased. When the pressure due to the hydrogen chloride exceeded the atmospheric pressure by more than 300 mm. of mercury, the pressure was relieved by connecting the flask by means of the three-way stopcock to the hydrogen chloride recovery system. When the temperature had reached 40° C., the pressure within the flask suddenly dropped and became lower than atmospheric pressure. If the flask were continuously shaken pressure decreased in spite of the fact that the temperature rose. After about 15 minutes, the temperature reached 70° C. At this point another mixture of 13 g. of hydrogen cyanide and 8 g. of water was added through the dropping funnel over a period of three minutes and the temperature rose to 80° C. Another 13 g. of hydrogen cyanide and 8 g. of water were added in the same way and the temperature rose to 90° C. As the fourth lot was being added, ammonium chloride began to precipitate and the temperature dropped below 90° C. By the time all of this lot had been added, the temperature had dropped to 60° C. This was about 25 minutes after adding the first hydrogen cyanide-water mixture. The contents of the flask were allowed to cool to about 25° C. and the excess hydrogen cyanide and hydrogen chloride were removed under vacuum. The contents of the flask were transferred to a distilling flask and distilled through a Synder floating ball column. 22 grams of liquid came over between 99° and 107° C. and contained 18 g. of formic acid. Substantially anhydrous acetic acid was then distilled off between 116° and 118° C. The residue contained ammonium chloride and formamide. The ammonium chloride was separated by suction filtration and weighed 23 g. when dried. The liquid residue was distilled in vacuo and yielded 44 g. of formamide boiling between 110° and 115° C. at 20 mm. of mercury pressure.

In a manner similar to that illustrated in the foregoing examples, aqueous propionic acid and the aqueous butyric acids can be dehydrated as well as other carboxylic acids which contain water and are liquid at 25° C. Carboxylic acids containing even very large amounts of water (50 per cent, 75 per cent or even 90 per cent or more by weight) can be dehydrated in accordance with our process.

The hydrogen chloride can be introduced into the aqueous acids as a gas or as a solution in water (hydrochloric acid) and the hydrogen cyanide can be introduced into the aqueous acids as a gas or as a solution in water (hydrocyanic acid or prussic acid). In a similar manner, carboxylic acids can be dehydrated using other organic nitriles.

What we claim as our invention and desire to be secured by Letters Patent of the United States is:

1. A process for dehydrating a carboxylic acid which is liquid at 25° C. and which contains water comprising reacting the aqueous acid with hydrogen chloride and a compound selected from the group consisting of hydrogen cyanide and a water soluble organic nitrile.

2. A process for dehydrating an aqueous carboxylic acid containing from one to four carbon atoms and of the homologous series of which formic acid is the first member comprising reacting the aqueous acid with hydrogen chloride and a compound selected from the group consisting of hydrogen cyanide and a water-soluble organic nitrile.

3. A process for dehydrating formic acid which contains water comprising reacting the aqueous formic acid with hydrogen chloride and a compound selected from the group consisting of hydrogen cyanide and a water-soluble organic nitrile.

4. A process for dehydrating formic acid which contains water comprising reacting the aqueous formic acid with hydrogen chloride and a compound selected from the group consisting of hydrogen cyanide and a water-soluble organic nitrile, and distilling the formic acid away from the amide and ammonium chloride which are formed.

5. A process for dehydrating acetic acid which contains water comprising reacting the aqueous acetic acid with hydrogen chloride and a compound selected from the group consisting of hydrogen cyanide and a water-soluble organic nitrile.

6. A process for dehydrating acetic acid which contains water comprising reacting the aqueous acetic acid with hydrogen chloride and a compound selected from the group consisting of hydrogen cyanide and a water-soluble organic nitrile, and distilling the acetic acid away from the amide and ammonium chloride which are formed.

7. A process for preparing an anhydrous cargoxylic acid comprising reacting a mixture of water and carboxylic acid which is liquid at 25° C. with sufficient hydrogen chloride and a compound selected from the group consisting of hydrogen cyanide and a water-soluble organic nitrile to dissipate substantially all the water.

8. A process for dehydrating a carboxylic acid which is liquid at 25° C. and which contains water comprising reacting the aqueous acid with hydrogen cyanide and hydrogen chloride.

9. A process for dehydrating an aqueous carboxylic acid containing from one to four carbon atoms and of the homologous series of which formic acid is the first member comprising reacting the aqueous acid with hydrogen cyanide and hydrogen chloride.

10. A process for dehydrating formic acid which contains water comprising reacting the aqueous formic acid with hydrogen cyanide and hydrogen chloride.

11. A process for dehydrating formic acid which contains water comprising reacting the aqueous formic acid with hydrogen cyanide and hydrogen chloride, and distilling the formic acid away from the formamide and ammonium chloride which are formed.

12. A process for dehydrating acetic acid which contains water comprising reacting the aqueous acetic acid with hydrogen cyanide and hydrogen chloride.

13. A process for dehydrating acetic acid which contains water comprising reacting the aqueous acetic acid with hydrogen cyanide and hydrogen chloride, and distilling the acetic acid away from the formamide and ammonium chloride which are formed.

14. A process for preparing an anhydrous carboxylic acid comprising reacting a mixture of water and acetic acid with sufficient hydrogen cyanide and hydrogen chloride to dissipate substantially all the water.

15. A process for preparing an anhydrous carboxylic acid comprising reacting a mixture of water and carboxylic acid which is liquid at 25° C. with sufficient hydrogen cyanide and hydrogen chloride to dissipate substantially all the water.

16. A process for preparing anhydrous formic acid comprising reacting a mixture of water and formic acid with sufficient hydrogen cyanide and hydrogen chloride to dissipate substantially all the water.

VERNON K. KRIEBLE.
ROBERT H. SMELLIE.

REFERENCES CITED

The following references are of record in the file of this patent:

UNITED STATES PATENTS

| Number | Name | Date |
| --- | --- | --- |
| 1,843,434 | Wietzel et al. | Feb. 2, 1932 |
| 1,912,585 | Lichtenthaeler | June 6, 1933 |
| 1,817,993 | Lichtenthaeler | Aug. 11, 1931 |
| 1,848,664 | Rohde | Mar. 8, 1932 |

OTHER REFERENCES

Taylor et al., "Sidgwicks Organic Chem. of Nitrogen" (1937), pages 139, 140, 310.

Hill et al., "Organic Chemistry" (Blakiston, 1943), page 322.